United States Patent [19]

Ling

[11] Patent Number: 5,139,616
[45] Date of Patent: Aug. 18, 1992

[54] REDUCTION OF STICKERS CONTAMINATION IN PAPERMAKING PROCESS USING RECYCLED PAPER

[75] Inventor: Tien-Feng Ling, Jacksonville, Fla.

[73] Assignee: Betz PaperChem, Inc., Jacksonville, Fla.

[21] Appl. No.: 706,826

[22] Filed: May 29, 1991

[51] Int. Cl.$^5$ .............................. D21H 11/14
[52] U.S. Cl. ...................... 162/147; 162/158; 162/173; 162/179; 162/189; 162/199
[58] Field of Search ............... 162/5, 158, 179, 199, 162/DIG. 4, 189, 173, 147

[56] References Cited

U.S. PATENT DOCUMENTS

| | | | |
|---|---|---|---|
| 4,643,800 | 2/1987 | Maloney et al. | 162/5 |
| 4,710,267 | 12/1987 | Elsby et al. | 162/5 |
| 4,886,575 | 12/1989 | Moreland | 162/5 |
| 4,923,566 | 5/1990 | Shawki et al. | 162/135 |

Primary Examiner—Peter Chin
Attorney, Agent, or Firm—Alexander D. Ricci; Gregory M. Hill

[57] ABSTRACT

In a papermaking operation which utilizes secondary fiber furnish containing hot melt or pressure sensitive adhesive contaminants, a method of inhibiting stickies comprising adding to the pulp slurry at least one surfactant selected from the group consisting of fatty alkanolamides and ethoxylated compounds in addition to a hydrocarbon solvent.

2 Claims, 2 Drawing Sheets

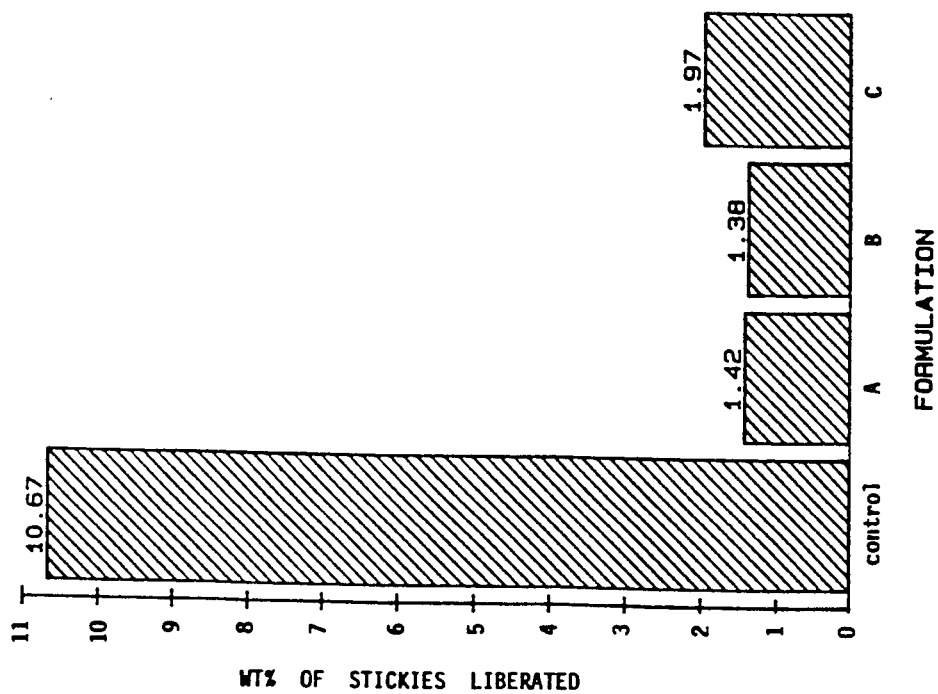

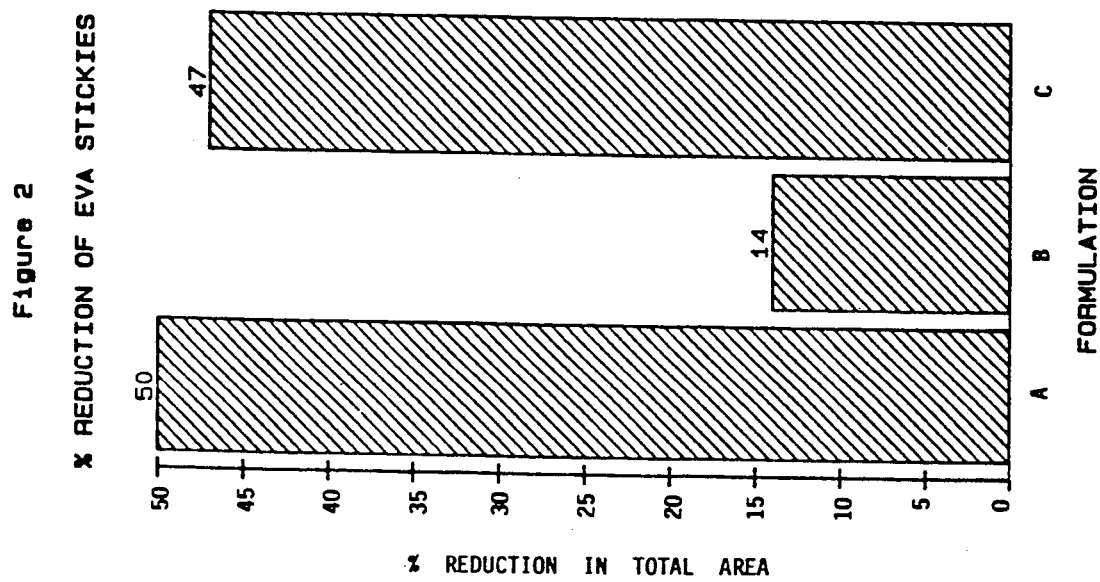

REDUCTION OF STICKERS CONTAMINATION IN PAPERMAKING PROCESS USING RECYCLED PAPER

FIELD OF THE INVENTION

The present invention relates to the use of secondary fiber in the papermaking industry. It is directed toward the reduction of stickies contamination resulting from the use of recycled paper.

BACKGROUND

The papermaking industry utilizes various amounts of recycled fiber or papers as a source of paper fiber furnish in the production of finished paper products. These recycled papers are often contaminated with pressure sensitive or hot melt adhesive tapes, seam bindings, labels, decals, stamps and stickers (e.g., bumper). These adhesives are referred to as stickies in the papermaking art.

Stickies are a diverse mixture of synthetic polymeric organic materials which are generally found in the application of recycled fiber papermaking processes. Stickies are relatively larger particles with a size in the range of several microns to several hundred microns. Pitch is a natural resinous substance which consists of resin/fatty acids and exists in the virgin fibers. White pitch occurs in paper mill recycling systems using broke with a latex coating binder. The size of pitch or white pitch is very small, and usually appears as colloidal particles.

During the pulping process, stickies are liberated from recycled fibers due to mechanical and thermal energy. For recycled fiber furnishes which contain a large quantity of plastic tapes, such as old corrugated containers, a significant amount of stickies are released during pulping. These stickies will not disperse well in the water and will either ultimately end up as "dirt spots" on the paper sheets or stick onto the wires, felts or other equipment requiring shutting down the manufacturing equipment in order to remove the stickies by solvent washing techniques.

According to the criteria developed by M. Doshi of Doshi & Associates, stickies can be classified on the basis of size:

| | |
|---|---|
| Large, retained on 35 mesh screen, | >0.42 mm |
| Medium, retained on 200 mesh screen, | 0.074–0.42 mm |
| Small, passed through 200 mesh screen, | <0.074 mm |

Large stickies are relatively easily removed by cleaning and screening and therefore do not pose significant problems. Stickies with small size are generally less of a problem as long as they remain stable in the stock. Medium stickies are more likely to be a problem because they cannot efficiently be removed from the stock by a mechanical cleaning system. These stickies have a tendency to agglomerate and cause wire deposition or are a detriment to product quality.

Several non-chemical approaches which have been used in the paper industry to combat stickies include furnish selection, screening and cleaning, and thermal/mechanical dispersion units. Each of these approaches has limitations. Furnish selection may reduce but not completely eliminate the stickie contaminants in the system. It also increases the production cost significantly. Stickies cannot be completely removed with mechanical cleaning equipment since minimum slot size is limited to 0.15 mm for manufacturing reasons. Thermal/mechanical dispersion units can enhance breakup of stickies, but cannot prevent the agglomeration downstream, where problems usually occur. In addition, this approach requires capital investment and energy expenditure.

Chemical treatment can considerably reduce or alleviate stickies problems at a lower cost although its application technology may prove slightly complicated. Current chemical treatment techniques for stickies removal/control include detackification (passivation), dispersion, wire treatment (electrochemical control), maximization of solids retention, and chemical enhanced stickies removal during mechanical cleaning.

DESCRIPTION OF RELATED ART

Conventional treatment programs directed toward a reduction in stickies related contamination in papermaking operations deal with either detackifying or tying up the suspended stickies particles. U.S. Pat. No. 4,886,575 is an example of one such program. It discloses adding a polymer of polyvinyl alcohol to the pulp slurry to either reduce the adhesion of stickies particles onto the paper making equipment or prevent them from adhering to the finished paper product.

In a related patent, U.S. Pat. No. 4,923,566, a similar process is taught. Here, urea is added to the pulp slurry for the purpose of pacifying the suspended stickies particles.

GENERAL DESCRIPTION OF THE INVENTION

It is often desirable to leave adhesive material with the plastic backing/facestock where it can be removed from the system instead of remaining with the paper fibers. In order to make adhesive material remain with the plastic backing/facestock, the adhesive-fiber bonding must be significantly reduced. This can be achieved with the addition of chemical agents. The reduction of adhesive-fiber bonding strength allows the adhesive material to be easily released from the fiber when applying the mechanical/thermal energy. A lower level of adhesive loss from the plastic backing/-facestock indicates that less adhesive would be present in the the fiber slurry as the adhesive would be removed with the plastic backing/facestock via cleaners. This results in a significant reduction of fiber/adhesive agglomeration due to the lower levels of stickies contamination. Improved cleaning efficiency results in increasing fiber yield. Meanwhile, pulping difficulties are also reduced.

Since mechanical cleaning systems are not 100% effective, those stickies which are liberated from the fiber and plastic backing/facestock cannot be removed completely. They behave like free hydrophobic particles in the fiber slurry. Due to characteristics such as tackiness, deformability, hydrophobicity, etc., these stickies particles have a tendency to agglomerate and deposit on wires or felts and detrimentally affect product quality. Therefore, it is important to prevent them from agglomerating or to further break them down into smaller particles downstream. This can be done by adding a proper type of surface-active agent.

DESCRIPTION OF THE DRAWINGS

FIG. 1 represents the amount of stickies liberated from adhesive tape in pulp slurries both with and without the treatment program of the present invention.

FIG. 2 shows how the invention reduces stickies present in the slurry via dispersion.

DETAILED DESCRIPTION OF THE INVENTION

It has been discovered that the addition of specific blends of surfactants and solvents to the pulper in a papermaking operation utilizing secondary fiber inhibits stickies contamination by significantly reducing the amount of stickies liberated from the furnish into the aqueous pulp slurry and preventing the re-agglomeration of those particles remaining in the aqueous slurry. The present invention comprises blending at least one surfactant with a hydrocarbon solvent.

The surfactant is selected from the group consisting of fatty alkonolamides and ethoxylated compounds. Representative fatty alkanolamides include oleic diethanolamide (Varamide A7, Sherex), Coco-N,N-bis(hydroxyethyl) amide (Varamide A10, Sherex) and coconut diethanolamide (Alkamide CDO, Rhone-Poulenc). Representative ethoxylated compounds include ethoxylated alkylphenols, such as alkylphenol ethoxylate (Surfonic N-95, Texaco), coconut amine ethoxylate (Varonic K-205, Sherex), tallow amine ethoxylate (Varonic T-205, Sherex) and fatty alcohol ethoxylate (Alfonic 1412-60, Vista).

The hydrocarbon solvent required by the present invention is selected from the group consisting of terpenes and aliphatic hydrocarbons. Exemplary terpenes include orange terpene (#1100 Orange Terpene, Intercit, Inc.) and d-limonene (citrus d-Limonene, Golden Gem Growers, Inc.). A characteristic aliphatic hydrocarbon may be acquired from Ashland Chemicals as 140 Solvent.

For the best results, the stickies inhibitor of the present invention is added to the repulping or papermaking system at a location that will allow intimate contact between the treatment and the contaminated paper stock for a period of time sufficient to permit the inhibitor to perform its function. The amount of stickies inhibitor added to the pulp slurry should be sufficient sufficient to allow for subsequent dilution so that a concentration of about 1-200 ppm is maintained in the repulper or on the paper machine at the point where stickies deposit control is desired.

The amount of individual chemical components of the stickies inhibitor may vary depending upon the amount and chemical makeup of the stickies present. Generally, the stickies inhibitor will contain from about 5-95% by weight of the surfactant and from about 5-95% solvent. Preferably, surfactant content will be in the range of about 50-90% by weight, and solvent content will be about 10-50% by weight.

EXPERIMENTAL

In order to determine the efficacy of the stickies inhibitor according to the present invention, a test using adhesive tape was devised.

The following results demonstrate the effectiveness of the surfactant/solvent composition on the reduction of adhesive material liberated from tape backing as well as on the dispersion of stickies in the pulp. An adhesive tape was placed on the surface of a paper and pressed at 20 psi to insure even adhesion. The paper furnish was treated with various products under the following pulping condition: 4% consistency, 140° F., pH 7.0, 60 minutes pulping time, and 500 rpm pulper speed. After repulping, all of the plastic backing was collected, rinsed with D.I. water, and dried in an oven at 120° F. for 24 hours. The percent loss of adhesive from the plastic backing was determined and the results are shown in FIG. 1. The results showed that furnish treated with formulations A, B, and C (Table 1) always provided lower levels (<2%) of adhesive released from the plastic backing compared to that of untreated (10.67%). Under the tested conditions, one percent of adhesive loss was equivalent to 3.75 lbs. stickies per ton of paper. A lower level of adhesive loss from the plastic backing indicated that less adhesive would be present in the fiber slurry as the adhesive would be removed with the plastic backing via cleaners.

TABLE 1

List of Formulations

| Formulation | Composition (By Weight) | |
|---|---|---|
| A | Alkamide CDO | 70% |
| | Surfonic N-95 | 10% |
| | Orange Terpenes | 20% |
| B | Alkamide CDO | 70 |
| | Surfonic N-95 | 10% |
| | 140 Solvent | 20% |
| C | Varamide A7 | 35% |
| | Varamide A10 | 35% |
| | Orange Terpenes | 30% |

The effect of these formulations on the relative reduction of stickies was studied using the laboratory pulper dispersion test. Ethylene copolymerized with Vinyl Acetate (EVA) was chosen in this work to represent hot melts. A sample of EVA stickies (retained on 50 mesh) equivalent to 10 lb/T was added directly to the laboratory pulper. The selected chemical treatment was added, and the slurry was repulped at 5% consistency for one hour at 1000 rpm and 150° F. The results are shown in FIG. 2. It is clear that all formulations were effective for the reduction of EVA stickies via dispersion.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. In a papermaking operation using secondary fiber furnish which contains pressure sensitive or hot melt adhesives, a method of inhibiting stickies contamination comprising adding to the aqueous pulp slurry of about 1 to about 200 ppm of a stickies inhibitor comprising from 5 to 95% by weight of at least one surfactant selected from the group consisting of oleic diethanolamide, coco-N, N-bis(hydroxyethyl)amide, coconut diethanolamide, alkylphenol ethoxylate, coconut amine ethoxylate, tallow amine ethoxylate and from 5 to 95% by weight of a hydrocarbon solvent selected from the group consisting of an aliphatic hydrocarbon, orange terpene and d-limonene to reduce the amount of stickies liberated from the furnish into the aqueous pulp slurry.

2. The method of claim 1 wherein the stickies inhibitor contains from about 50-90% by weight of at least one surfactant and from about 10-50% by weight of solvent.

* * * * *